(12) United States Patent
Samper et al.

(10) Patent No.: US 9,138,714 B2
(45) Date of Patent: Sep. 22, 2015

(54) MICROFLUIDIC CHIP AND A RELATED METHOD THEREOF

(75) Inventors: Victor Donald Samper, Bavaria (DE); Ruben Julian Horvath-Klein, Munich (DE); Marko Klaus Baller, Saarbrücken (DE); Christian Friedrich Peter Rensch, Munich (DE); Christoph Boeld, Munich (DE); Xavier Yvon André Franci, Seilles (BE)

(73) Assignee: General Electric Company, Niskayuna, NY (US)

( * ) Notice: Subject to any disclaimer, the term of this patent is extended or adjusted under 35 U.S.C. 154(b) by 164 days.

(21) Appl. No.: 13/285,855

(22) Filed: Oct. 31, 2011

(65) Prior Publication Data

US 2013/0108513 A1    May 2, 2013

(51) Int. Cl.
*B01L 3/00* (2006.01)
*B01J 19/00* (2006.01)

(52) U.S. Cl.
CPC .............. *B01J 19/0093* (2013.01); *B01L 3/527* (2013.01); *B01J 2219/0097* (2013.01); *B01J 2219/00783* (2013.01); *B01J 2219/00873* (2013.01); *B01J 2219/00876* (2013.01); *B01J 2219/00885* (2013.01); *B01J 2219/00889* (2013.01); *B01J 2219/00894* (2013.01); *B01J 2219/00898* (2013.01); *B01J 2219/00903* (2013.01); *B01J 2219/00932* (2013.01);
(Continued)

(58) Field of Classification Search
CPC .............. B01J 2219/00783; B01J 2219/00873; B01J 2219/00876; B01J 2219/00885; B01J 2219/00889; B01J 2219/00894; B01J 2219/00898; B01J 2219/00903; B01J 2219/00932; B01J 2219/0091; B01J 2219/00976; B01L 3/527
USPC ........................ 422/50, 63, 67, 68.1, 500–507
See application file for complete search history.

(56) References Cited

U.S. PATENT DOCUMENTS 5,922,591 A * 7/1999 Anderson et al. ........... 435/287.2
6,056,859 A * 5/2000 Ramsey et al. .............. 204/451
(Continued)

FOREIGN PATENT DOCUMENTS

| WO | 199526796 A1 | 10/1995 |
| WO | 2008140616 A2 | 11/2008 |
| WO | 2010114858 A | 10/2010 |

OTHER PUBLICATIONS

Wang et al., self-actuated, thermo-responsive hydrogel valves for lab on a chip, Biomedical Microdevices, 2005, 7:4, 313-322.*

(Continued)

*Primary Examiner* — Lyle Alexander
*Assistant Examiner* — Robert Eom
(74) *Attorney, Agent, or Firm* — Jenifer E. Haeckl

(57) ABSTRACT

A microfluidic chip includes a plurality of reagent sources for a feeding a plurality of reagents, each reagent source feeding a corresponding reagent among the plurality of reagents. A macro-chamber receives one or more reagents among the plurality of reagents from the plurality of reagent sources. A microfluidic reactor is coupled to the macro-chamber and the plurality of reagent sources and configured to receive two or more reagents among the plurality of reagents from at least one of the macro-chamber, the plurality of reagent sources, and react the two or more reagents to generate a reaction content.

19 Claims, 4 Drawing Sheets

(52) U.S. Cl.
CPC ............. *B01J 2219/00961* (2013.01); *B01J 2219/00979* (2013.01); *B01L 2200/027* (2013.01); *B01L 2300/0816* (2013.01); *B01L 2300/0867* (2013.01); *B01L 2400/0478* (2013.01)

(56) References Cited

U.S. PATENT DOCUMENTS

| | | |
|---|---|---|
| 7,771,985 B2 * | 8/2010 | Wilding et al. ............ 435/287.1 |
| 7,829,032 B2 | 11/2010 | Van Dam et al. |
| 2004/0258569 A1 * | 12/2004 | Yamazaki et al. ............ 422/100 |
| 2008/0281090 A1 | 11/2008 | Lee et al. |
| 2009/0060797 A1 | 3/2009 | Mathies et al. |
| 2010/0182868 A1 | 7/2010 | Woehl |
| 2011/0005932 A1 | 1/2011 | Jovanovich et al. |
| 2011/0103176 A1 | 5/2011 | Van Dam et al. |
| 2011/0136252 A1 | 6/2011 | Tseng et al. |
| 2011/0150714 A1 | 6/2011 | Elizarov et al. |

OTHER PUBLICATIONS

Gong et al., All-electronic droplet generation on-chip with real-time feedback control for EWOD digital microfluidics, Lab Chip, 2008, 898-906.*

Chiem et al., "Microchip Systems for Immunoassay: An Integrated Immunoreactor with Electrophoretic Separation for Serum Theophylline Determination", Clinical Chemistry, vol. 44, 1998, pp. 591-598.

Elizarov et al., "Design and Optimization of Coin-Shaped Microreactor Chips for PET Radiopharmaceutical Synthesis", Journal of Nuclear Medicine, vol. 51, Issue 2, Feb. 2010, pp. 282-287.

Search Report and Written Opinion from corresponding PCT Application No. PCT/US2012/058841 dated Apr. 29, 2013.

* cited by examiner

MICROFLUIDIC CHIP AND A RELATED METHOD THEREOF

BACKGROUND

Microfluidic devices and methods are of significant and increasing importance in biomedical and pharmaceutical research. Microfluidic technology is applied to sequentially synthesize or batch synthesize fine chemicals and pharmaceuticals. Continuous flow micro-reactors have been used but not limited to manipulate individual chemical processes on nanoliter to microliter scales with advantages of enhanced heat transfer performance, faster diffusion times and reaction kinetics, and improved reaction product selectivity.

Large-scale synthesis modules have been developed and used for the preparation of a number of radiopharmaceutical compounds. However, such modules or reactors occupy a large amount of space, often consume larger than desired amounts of reagents, and the chemical process requires longer reaction time cycles than desired for the preparation of the labeled compounds.

BRIEF DESCRIPTION

In accordance with one exemplary embodiment of the present invention, a microfluidic chip is disclosed. The chip includes a plurality of reagent sources for a feeding a plurality of reagents, each reagent source feeding a corresponding reagent among the plurality of reagents. The chip also includes a macro-chamber for receiving one or more reagents among the plurality of reagents from the plurality of reagent sources. The chip further includes a microfluidic reactor coupled to the macro-chamber and the plurality of reagent sources and configured to receive two or more reagents among the plurality of reagents from at least one of the macro-chamber, the plurality of reagent sources, and react the two or more reagents to generate a reaction content.

In accordance with another exemplary embodiment of the present invention, a related method is disclosed. The method includes feeding two or more reagents among a plurality of reagents from a plurality of reagent sources to a macro-chamber. The method also includes feeding two or more reagents among the plurality of reagents from at least one of the macro-chamber, the plurality of reagent sources to a microfluidic reactor. The method further includes reacting the two or more reagents among the plurality of reagents in the microfluidic reactor to generate a reaction content; wherein the macro-chamber and the microfluidic reactor are disposed in a microfluidic chip.

DRAWINGS

These and other features and aspects of embodiments of the present invention will become better understood when the following detailed description is read with reference to the accompanying drawings in which like characters represent like parts throughout the drawings, wherein.

DETAILED DESCRIPTION

As disclosed in detail below, embodiments of the present invention disclose a microfluidic chip. The microfluidic chip includes a plurality of reagent sources, a macro-chamber, and a microfluidic reactor. The macro-chamber receives one or more reagents among the plurality of reagents from the plurality of reagent sources. The microfluidic reactor is coupled to the macro-chamber and the plurality of reagent sources and configured to receive two or more reagents among the plurality of reagents from at least one of the macro-chamber, the plurality of reagent sources, react the two or more reagents to generate a reaction content, and feed the reaction content to the macro-chamber. In some embodiments, the microfluidic chip may include a plurality of elements, each element having a macro-chamber, a mixing device, and the microfluidic reactor. In accordance with certain embodiments of the present invention, a method for operating the microfluidic chip is disclosed.

Figure 1:
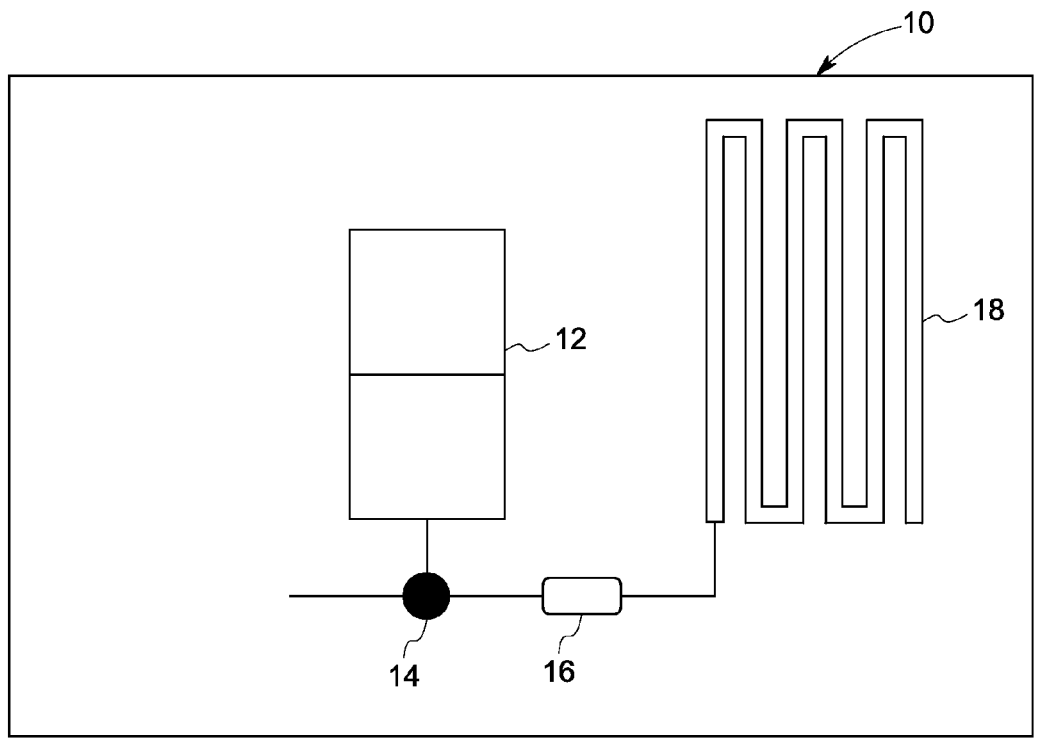
FIG. 1 is a diagrammatical view of a microfluidic chip having a macro-chamber, a mixing device, a fluid chamber, and a microfluidic reactor in accordance with an exemplary embodiment of the present invention.

Referring to FIG. 1, a microfluidic chip 10 in accordance with an exemplary embodiment of the present invention is disclosed. In the illustrated embodiment, the microfluidic chip 10 includes a macro-chamber 12, a mixing device 14, a fluid chamber 16, and a microfluidic reactor 18. The macro-chamber 12 is used for storing one or more reagents temporarily, or for performing operations advantageously at a size domain where gravity, mass, and other macro effects dominate over microscale dominating phenomena such as viscosity and surface tension e.g. bubble extraction into a headspace, boiling, liquid phase extraction, sedimentation, or the like. In one embodiment, the macro-chamber 12 includes an azeotropic chamber. In other embodiments, other types of macro-chambers are envisaged. The mixing device 14 is coupled to the macro-chamber 12 and configured to mix two or more reagents and to generate a mixture of two or more reagents. The fluid chamber 16 is used for storing a marker fluid. In a specific embodiment, the marker fluid is a gas slug. In another embodiment, the marker fluid is a fluorescent liquid having a different property compared to the gas slug. In the illustrated embodiment, the microfluidic reactor 18 is coupled to the macro-chamber 12 via the mixing device 14 and the fluid chamber 16. The microfluidic reactor 18 is configured to receive the mixture of two or more reagents from the macro-chamber 12 and generate reaction content. The reagents may include liquid reagents, gaseous reagents, or combinations thereof. In certain embodiments, the macro-chamber 12 may be integrated to the microfluidic reactor 18.

In one embodiment, the mixing device 14 is configured to receive two or more reagents from a plurality of reagent sources, and mix the two or more reagents to generate a mixture of two or more reagents. It should be noted herein that all types of mixing devices can be implemented. In a specific embodiment, the mixture of two or more reagents are fed from the mixing device 14 to the macro-chamber 12. In a more specific embodiment, the mixture of two or more reagents are fed from the mixing device 14 to the microfluidic reactor 18.

In another embodiment, the mixing device 14 is configured to receive two or more reagents from the macro-chamber 12, mix the two or more reagents to generate the mixture of two or more reagents, and then feed the mixture of two or more reagents into the macro-chamber 12. In a specific embodiment, the mixture of two or more reagents are fed from the mixing device 14 to the microfluidic reactor 18.

In one embodiment, the mixing device 14 is integrated with the macro-chamber 12 and configured to mix the two or more reagents within the macro-chamber 12. In another embodiment, the mixing device 14 is a gas supply source configured to supply gas bubbles to the macro-chamber 12 so as to enable mixing of the two or more reagents stored in the macro-chamber 12. In a specific embodiment, the mixing device 14 may be employ ultrasonic agitation for mixing two or more reagents. In another embodiment, the mixing device 14 is integrated with the microfluidic reactor 18 and configured to mix two or more reagents within the microfluidic reactor 18.

In the illustrated embodiment, during operation of the microfluidic chip 10, the microfluidic reactor 18 is maintained at a first temperature and the macro-chamber 12 is maintained at a second temperature substantially lower than the first temperature. In another embodiment, the microfluidic reactor 18 may be maintained at a lower temperature than the macro-chamber 12, or driven to ramp up or down in temperature. In a specific embodiment, the microfluidic reactor 18 and the macro-chamber 12 may be maintained at the same temperature (predefined temperature). In one embodiment, the reaction content is fed from the microfluidic reactor 18 to the macro-chamber 12. In another embodiment, the reaction content is temporarily stored in the microfluidic reactor 18 and not fed to the macro-chamber 12. The microfluidic reactor 18 has a meander configuration having high surface to volume ratio. In some embodiments, the microfluidic reactor 18 has a relatively large thermal mass to allow stored heat to be used for heating the content in the microfluidic reactor 18. In other embodiments, the reactor 18 has thin walls to enable good heat transfer to or from a heat source or sink. Good thermal conductivity of the substrate material is preferred for both the large thermal mass configuration and the thin wall configuration of the reactor 18. In certain embodiments, the reactor 18 may be optically transparent and may be used for inductive heating, electromagnetic or optical resistive heating.

Figure 2:
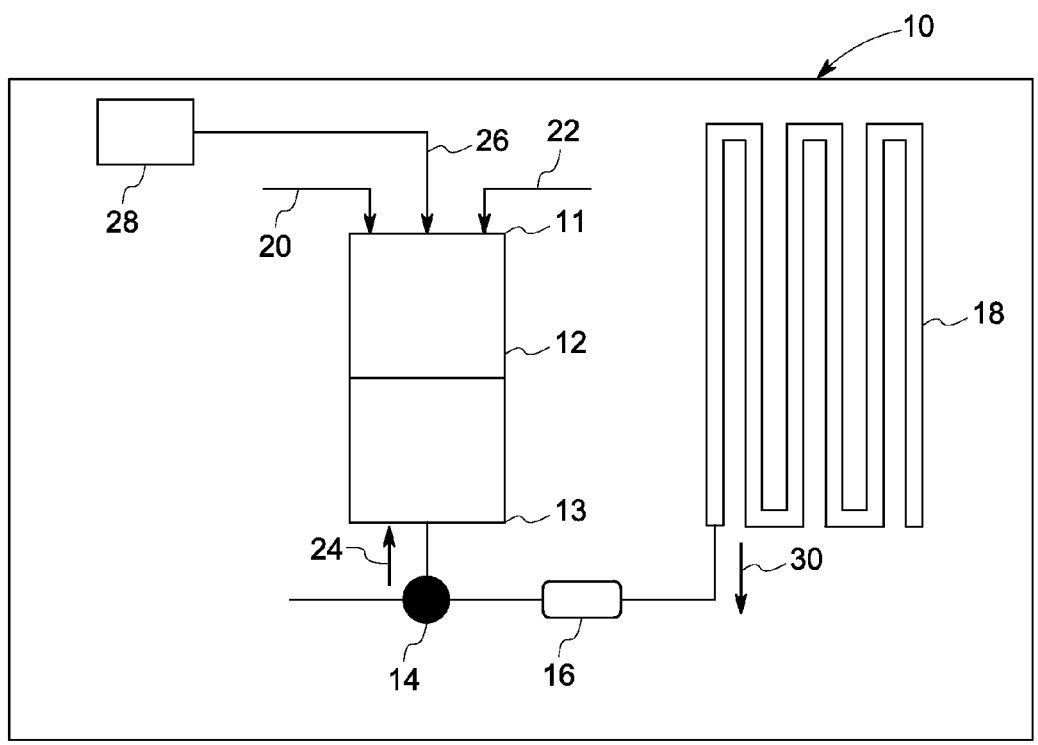
FIG. 2 is a diagrammatical view of a microfluidic chip having a macro-chamber, a mixing device, a fluid chamber, and a microfluidic reactor in accordance with an exemplary embodiment of the present invention.

Referring to FIG. 2, the microfluidic chip 10 and an associated method of operation is disclosed in accordance with an exemplary embodiment of the present invention. As discussed previously, the microfluidic chip 10 includes the macro-chamber 12, the mixing device 14, the fluid chamber 16, and the microfluidic reactor 18. In the illustrated embodiment, two reagents 20, 22 are fed to the macro-chamber 12. In other embodiments, more than two reagents are envisaged. In one embodiment, the two reagents 20, 22 are fed to the macro-chamber 12 simultaneously. In another embodiment, the two reagents 20, 22 are fed to the macro-chamber 12 sequentially. The two reagents 20, 22 are then fed from the macro-chamber 12 to the mixing device 14. The two reagents 20, 22 are mixed within the mixing device 14 to generate a mixture 24 of the reagents. The mixture 24 of the reagents is then fed from the mixing device 14 to the macro-chamber 12. In one embodiment, the mixing device 14 may be within the macro-chamber 12 so as to enable mixing of the reagents 20, 22 within the macro-chamber 12. In another embodiment, the mixture 24 of the reagents is fed from the mixing device 14 to the microfluidic reactor 18. The mixing device 14 may include a gas bubble source, a magnetic stirrer bar, a split and recombine structure, a structure or process that maximizes interfacial surface area, or the like. In another embodiment, the mixing device 14 may be within the microfluidic reactor 18 so as to enable mixing of the reagents 20, 22 within the reactor 18.

In the illustrated embodiment, after the mixture 24 of the reagent is generated in the macro-chamber 12, or otherwise exists in macro-chamber 12, a displacement fluid 26 is fed from a fluid source 28 to the macro-chamber 12 so as to displace the mixture 24 of the reagent (positive or negative volume displacement) from the macro-chamber 12 to the microfluidic reactor 18 via the fluid chamber 16. The displacement fluid 26 may be a liquid or a gas. The mixture 24 of the reagents is transported as a "slug" disposed between the marker fluid from the fluid chamber 16 and the fed displacement fluid 26. In another embodiment, instead of transporting as a slug between the marker fluid and the displacement fluid 26, pressurized pumping may be employed to transfer the mixture 24 of the reagents from the macro-chamber 12 to the microfluidic reactor 18. In another embodiment, a positive or negative pressure may be applied at an input end 11 of the macro-chamber 11 to displace contents from the chamber 11. In yet another embodiment, a positive or negative pressure may be applied at an output end 13 of the macro-chamber 11 to displace contents from the chamber 11. In other embodiments, combinations of positive and negative pressures may be simultaneously applied at the input end 11 and the output end 13 to control flow. The mixture 24 of the reagents is then reacted in the microfluidic reactor 18 to generate a reaction content 30. The reaction content 30 may then be transferred from the microfluidic reactor 18 to the macro-chamber 12. More reagents may be fed to macro-chamber 12, mixed with the reaction content, and then displaced to the microfluidic reactor 18 as discussed above. The process may be repeated as many number of times as per requirement. In some embodiments, the reaction content 30 may not be fed back to the macro-chamber 12 so as to avoid any water-sensitive reaction of the reaction content 30 due to a previous step that utilized water. Instead the content 30 may be fed forward to another chip 10, integrated on the same device substrate or connected to another device substrate.

Figure 3:
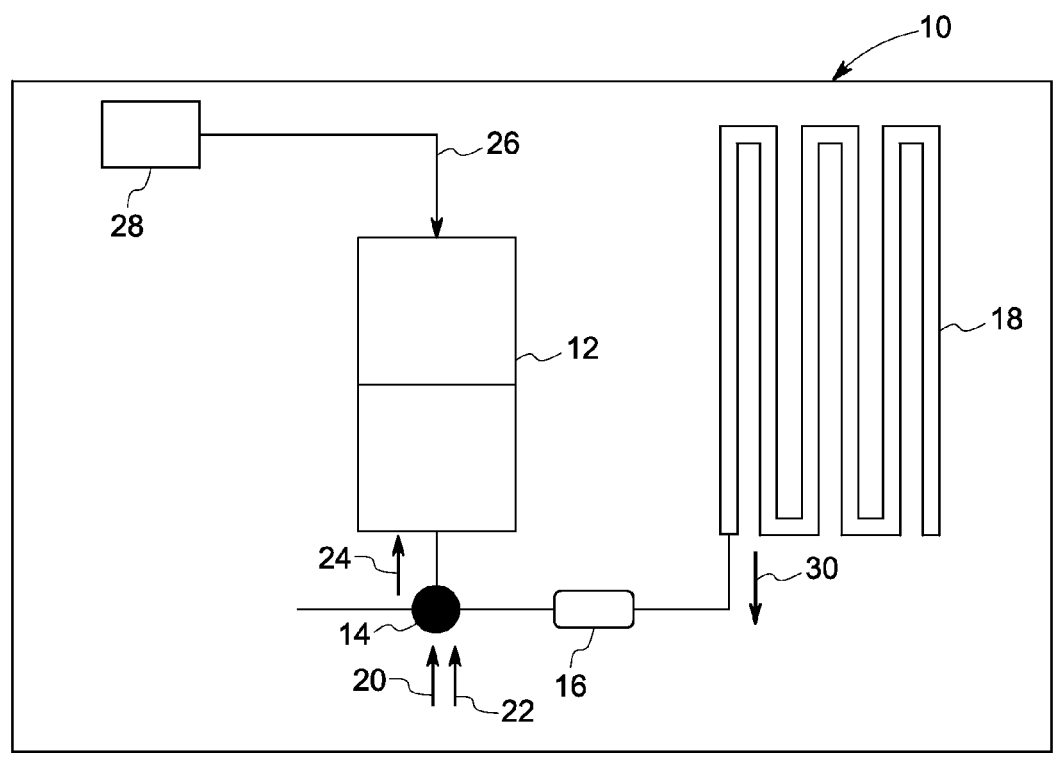
FIG. 3 is a diagrammatical view of a microfluidic chip having a macro-chamber, a mixing device, a fluid chamber, and a microfluidic reactor in accordance with an exemplary embodiment of the present invention.

Referring to FIG. 3, the microfluidic chip 10 and an associated method of operation is disclosed in accordance with an exemplary embodiment of the present invention. As discussed previously, the microfluidic chip 10 includes the macro-chamber 12, the mixing device 14, the fluid chamber 16, and the microfluidic reactor 18. In the illustrated embodiment, the two reagents 20, 22 are fed to the mixing device 14 sequentially or simultaneously. In other embodiments, more than two reagents are envisaged. The two reagents 20, 22 are mixed within the mixing device 14 to generate a mixture 24 of the reagents. The mixture 24 of the reagents is then fed from the mixing device 14 to the macro-chamber 12. In one embodiment, the mixing device 14 may be within the macro-chamber 12 so as to enable mixing of the reagents 20, 22 within the macro-chamber 12. In another embodiment, the mixture 24 of the reagents is fed from the mixing device 14 to the microfluidic reactor 18. Similar to the embodiment of FIG. 2, the reaction content 30 and/or additional reagents may then be displaced between the microfluidic reactor 18 and the macro-chamber 12. In certain embodiments, the chip 10 may not include the mixing device 14 and the fluid chamber 16.

In accordance with the embodiments discussed herein, the macro-chamber is typically maintained cooler than the microfluidic reactor to avoid reactive conditions. The microfluidic reactor may be pre-heated to a desired temperature so that a reaction is initiated or progresses at a required rate while the reagents are in the microfluidic reactor. Upon completion of the desired reaction in the microfluidic reactor, contents in the microfluidic reactor may be transported to the macro-chamber. Such a process may be repeated several times, with additional reagents added to the macro-chamber at each step.

Figure 4:
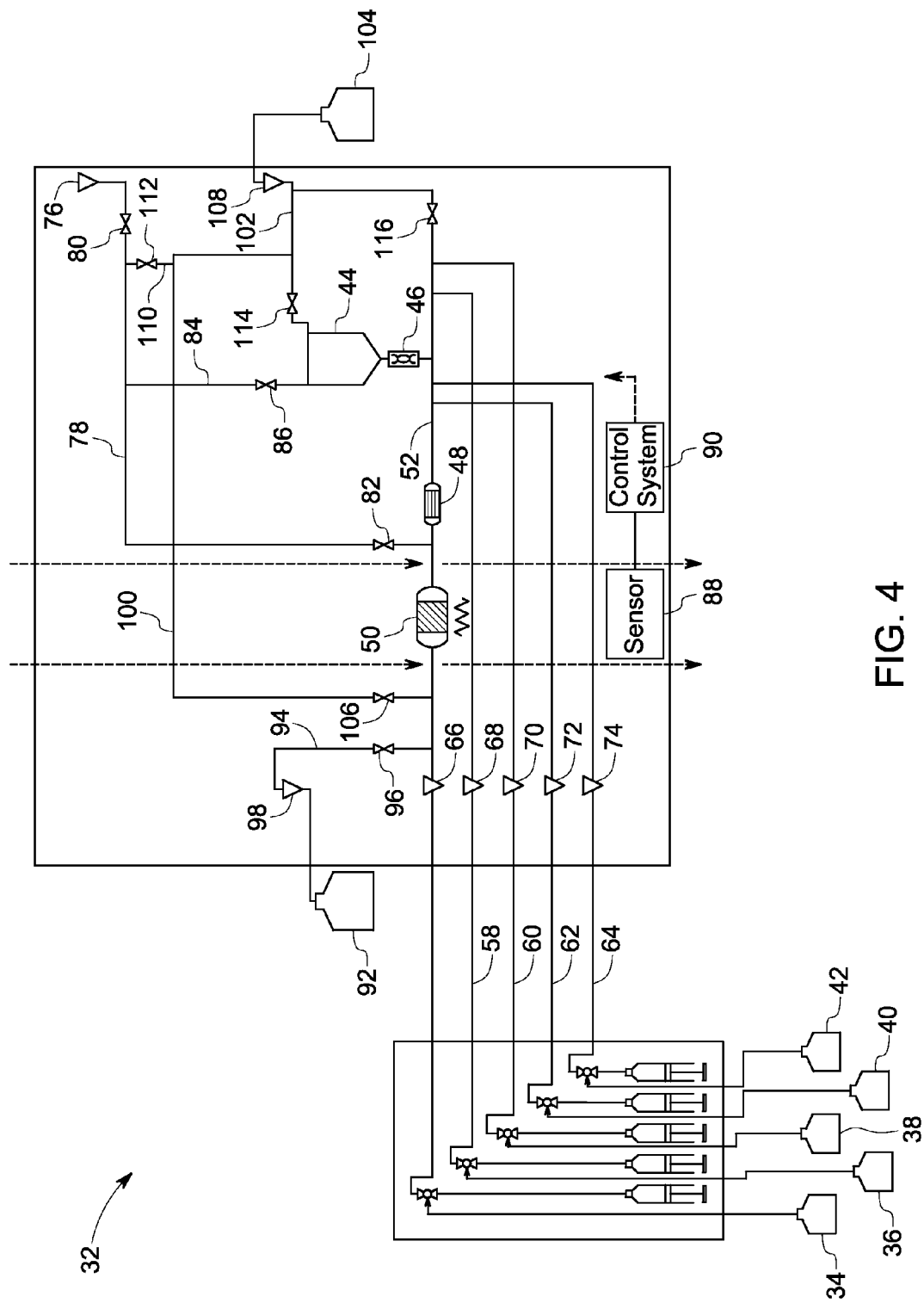
FIG. 4 is a diagrammatical detailed view of a microfluidic chip in accordance with an exemplary embodiment of the present invention.

Referring to FIG. 4, a detailed view of a microfluidic chip 32 coupled to a plurality of reagent sources 34, 36, 38, 40, 42 is disclosed. It should be noted herein that in other embodiments, the configuration of the microfluidic chip 32, coupling of the reagent sources 34, 36, 38, 40, 42 with the microfluidic chip 32, and the number of reagent sources may vary depending on the requirement.

In the illustrated embodiment, the microfluidic chip 32 includes a macro-chamber 44, a mixing device 46, a fluid chamber 48, and a microfluidic reactor 50. The macro-chamber 44 and the mixing device 46 are coupled to the fluid chamber 48, and the microfluidic reactor 50 via a flow path 52.

One reagent source 34 is coupled to the flow path 52 at a point upstream of the microfluidic reactor 50. The other reagent sources 36, 38, 40, 42 are coupled via flow paths 58, 60, 62, 64 respectively to the flow path 52 at a point downstream of the fluid chamber 48. Chip-to-external-source connections 66, 68, 70, 72, 74 are provided in the flow paths 52, 58, 60, 62, 64 for directing reagents from the plurality of reagent sources 34, 36, 38, 40, 42. A fluid source 76 is coupled to the flow path 52 at a point between the microfluidic reactor 50 and the fluid chamber 48 via a flow path 78. The flow path 78 is provided with control valves 80, 82 to control the flow of marker fluid. In the illustrated embodiment, the flow path 78 is also coupled to the macro-chamber 44 via a flow path 84 provided with a flow control valve 86.

Similar to the previously discussed embodiments, the macro-chamber 44 is used for temporarily storing the reagents from the reagent sources 34, 36, 38, 40, 42, or performing a process that takes place advantageously at a macro or larger than micro scale, where different physical phenomenon dominate in fluid dynamics. The mixing device 46 is coupled to the macro-chamber 44 and configured to mix the reagents and generate a mixture of the reagents.

In one embodiment, the mixing device 46 is configured to receive two or more reagents from the plurality of reagent sources 34, 36, 38, 40, 42, and mix the two or more reagents to generate a mixture of two or more reagents. In a specific embodiment, the mixture of two or more reagents are fed from the mixing device 46 to the macro-chamber 44. In a more specific embodiment, the mixture of two or more reagents are fed from the mixing device 46 to the microfluidic reactor 50.

In another embodiment, the mixing device 46 is configured to receive two or more reagents from the macro-chamber 44, mix the two or more reagents to generate the mixture of two or more reagents, and then feed the mixture of two or more reagents into the macro-chamber 44. In a specific embodiment, the mixture of two or more reagents are fed from the mixing device 46 to the microfluidic reactor 50.

The fluid chamber 48 is used for storing marker fluid fed from the fluid source 76. The microfluidic reactor 50 is configured to receive the mixture of two or more reagents from the macro-chamber 44 or from the reagent sources 34, 36, 38, 40, 42 and generate a reaction content. In one embodiment, the reaction content is fed from the microfluidic reactor 50 to the macro-chamber 44. In another embodiment, the reaction content is temporarily stored in the microfluidic reactor 50 and not fed to the macro-chamber 44.

In the illustrated embodiment, after the mixture of the reagent is generated in the macro-chamber 44, a displacement fluid may be fed from a fluid source 76 to the macro-chamber 44 so as to displace the mixture of the reagent from the macro-chamber 44 to the microfluidic reactor 50 via the fluid chamber 48. The mixture of the reagent is transported as a "slug" disposed between the marker fluid from the fluid chamber 48 and the fed displacement fluid. The microfluidic chip 32 further includes a sensor 88 for sensing the interface between the marker fluid, mixture of the reagent, and the displacement fluid. The sensor 88 may be an optical sensor, radiation sensor, acoustic sensor, thermal conductivity sensor, electric resistance or impedance sensor, or an electromagnetic sensor. In other words, the sensor 88 may be any type of sensor that can distinguish a property that differs between a sample slug and start and end material that confines the sample slug. A control system 90 receives an output signal from the sensor 88 and controls the plurality of flow control devices and control valves discussed herein for controlling flow of the reagents and the reaction content between the plurality of sources 34, 36, 38, 40, 42, the macro-chamber 44, the mixing device 46, and the microfluidic reactor 50. In the illustrated embodiment, the control system 90 is a closed-loop control system. In another specific embodiment, the chip 32 may not include the sensor 88, and the control system 90 may be an open-loop control system.

The reaction content from the micro-fluidic reactor 50 may be fed to a product chamber 92 via the flow paths 52, 94. The flow path 94 is provided with a control valve 96 and a flow control device 98 to control the flow of reaction content fed from the micro-fluidic reactor 50 to the product chamber 92. A waste content from the micro-fluidic reactor 50 may be fed via the flow paths 100, 102 to a waste chamber 104. The paths 100, 102 are provided with a flow control valve 106, and a flow control device 108 respectively. The flow path 78 is also coupled to the flow path 100 via another flow path 110 having a flow control valve 112. The flow path 102 from the waste chamber 104 is also coupled to the macro-chamber 44. The flow path 102 is also provided with a flow control valve 114. The flow path 52 further includes a flow control valve 116 and is coupled to the flow path 102. It should be noted herein that the plurality of flow control valves discussed herein are on-chip valves. In some embodiments, the flow control valves may be off-chip valves.

Figure 5:
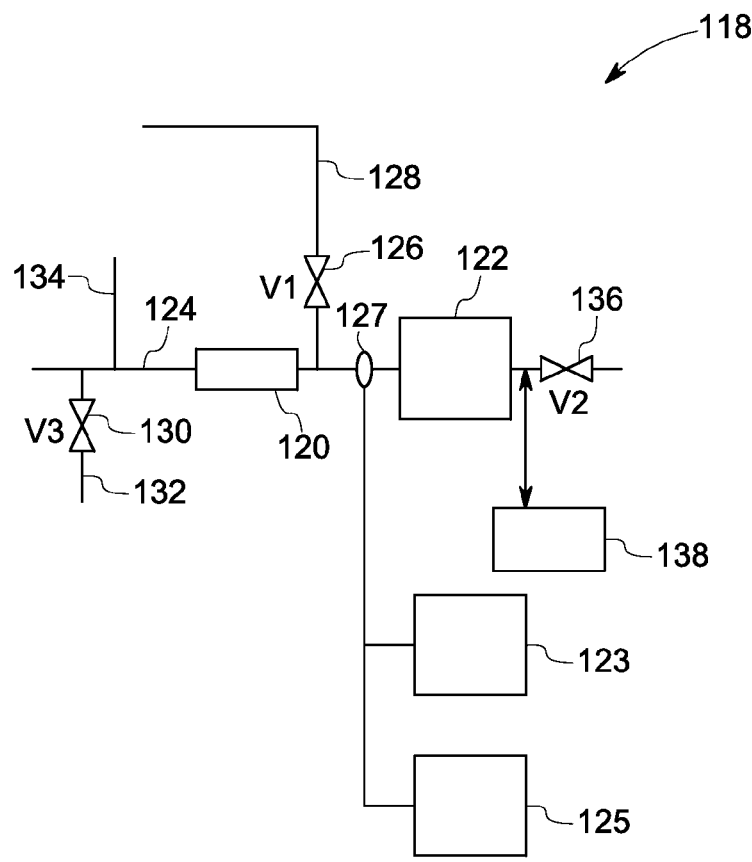
FIG. 5 is a diagrammatical view of a microfluidic chip having a sensor for sensing presence of liquid or gas in accordance with an exemplary embodiment of the present invention.

Referring to FIG. 5, a portion of a microfluidic chip 118 and an associated method is disclosed. It should be noted herein that the chip 118 disclosed herein is an exemplary embodiment and the number and location of the various components in the chip 118 may vary depending on the application. In the illustrated embodiment, the chip 118 includes a fluid chamber 120 and a plurality of microfluidic reactor units 122, 123, 125 coupled to a channel 124. A control valve 126 is provided in a flow channel 128 coupled to the channel 124 at a location between the fluid chamber 120 and the reactors 122, 123, 125. A switching device 127 may be used control flow from a macro-chamber to the plurality of reactors 122, 123, 125 via the channel 124. A flow control valve 130 is provided in a waste channel 132 coupled to the channel 124. Another flow control valve 136 is provided in the channel 124 downstream of the microfluidic reactors 122, 123, 125.

Initially a reagent is pumped via a channel 134 to prime the channel 124. The valves 126 and 136 are closed and valve 130 is opened to drain any excess reagent flows through the waste channel 132. Then valves 126, 130 are closed and valve 136 is opened. A displacement liquid is pumped through the channel 124 so as to flow out through the reactors 122, 123, 125. The valve 136 is then closed and valves 126, 130 are opened.

Marker fluid is fed through the channel 128 so as to fill the fluid chamber 120. The excess marker fluid flow may be directed through the channel 132. The chip 118 is now primed. Thereafter, valves 126, 130 are closed and the reagent followed by displacement fluid is fed through the channels 134, 124, fluid chamber 120, to the reactors 122, 123, 125 in such a way that a marker fluid is located upstream of the reagent. It should be noted herein that sequence of steps disclosed herein is an exemplary embodiment and may vary depending upon the application. When the reagent and the marker fluid exit the reactors 122, 123, 125, the marker fluid may be detected by a sensor 138, for example an optical sensor as disclosed in FIG. 4. In certain embodiments, the sensor 138 may be an electrical sensor, an acoustic sensor, a magnetic sensor, a radioactive sensor, or the like. The sensor output enables a closed-loop control of the various components of the chip 118. In some embodiments, the reagent is transported as a slug between the marker fluid and a displacement liquid. In certain other embodiments, the reagent is transported as slug between marker fluid both at a front side and a rear side. In such embodiments, the marker fluid at the rear side prevent mixing of the reagent slug and the displacement fluid so as to avoid dilution of the reagent. In a particular embodiment, fluorescent stained liquid may be used The volume of the marker fluid fed through the channel 128 may be controlled using on-chip valves. The marker fluid is fed either in a pumping mode or suction mode. The control of the volume of the marker fluid fed facilitates to control flow of finite quantities of reagent in the chip 118.

Figure 6:
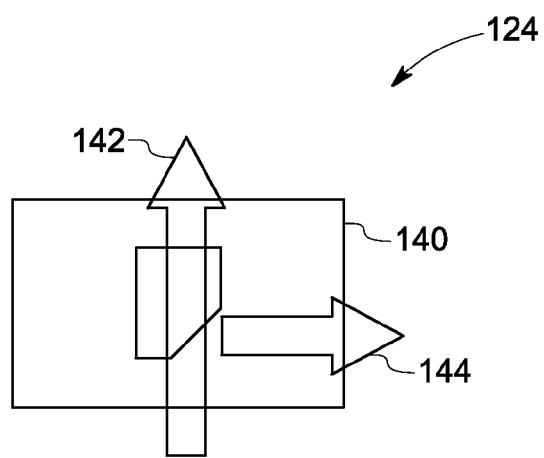
FIG. 6 is a diagrammatical view of a portion of a channel in a microfluidic chip employing optical sensing technique in accordance with an exemplary embodiment of FIG. 5.

Referring to FIG. 6, a portion 140 of the channel 124 downstream of the reactor is disclosed in accordance with an embodiment of FIG. 5. In the illustrated embodiment, the portion 140 of the channel 124 may be filled with a liquid reagent or gas at a particular instant of time. The sensor is employed, for example an optical sensor, to detect presence of gas or liquid in the portion 140 of the channel 124. When the portion 140 of the channel 124 is filled with a liquid having a refractive index close to that of the material of channel portion 140, light rays are transmitted through the portion 140 of the channel 124 as indicated by an arrow 142 since refractive of the liquid is almost same as the refractive index of the channel 124. When the portion 140 of the channel 124 is filled with a gas, light rays are reflected from the portion 140 of the channel 124 as indicated by an arrow 144 since refractive of the liquid is substantially different from the refractive index of the channel 124. In other embodiments, the sensors may be employed similarly at any other suitable locations of the microfluidic chip. In certain embodiments, as discussed above, the sensor may be an electrical sensor, an acoustic sensor, a magnetic sensor, a radioactive sensor, or the like.

In accordance with the embodiments discussed above, the microfluidic chip utilizes a "see-saw" configuration, wherein reagents/reaction content may be transported back and forth between the macro-chamber and the microfluidic reactor. In such a configuration, complex multi-step reactions are performed within a compact chip. Such a configuration avoids the need to have a separate reactor for each step and provides the advantages of micro and macro configurations in an integrated device. The thermal mass and the surface area of the microfluidic reactor may be significantly higher than that of the reagents stored in the microfluidic reactor, allowing stored heat in the microfluidic reactor to be transferred quickly to the reagents stored in the microfluidic reactor. The relatively hot microfluidic reactor and the cold macro-chamber for reaction and storage of the reagents enable process control, allowing reactions to be quenched quickly. Alternative microfluidic reactor designs facilitate heat transfer to or from external or internal heat source or sinks, enabling fast temperature ramping.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A microfluidic chip, comprising:
 a plurality of reagent sources for a feeding a plurality of reagents, each reagent source feeding a corresponding reagent among the plurality of reagents;
 a macro-chamber having a funnel shape and oriented along a vertical direction, and configured to process one or more reagents among the plurality of reagents from the plurality of reagent sources on a macro scale where a plurality of macro effects comprising gravity and mass dominate over a plurality of micro effects comprising viscosity and surface tension;
 a microfluidic reactor coupled to the macro-chamber and the plurality of reagent sources and configured to process two or more reagents among the plurality of reagents from at least one of the macro-chamber, the plurality of reagent sources, and to enable contact of the two or more reagents to generate a reaction; a product chamber; a fluid chamber; a waste chamber; and
 a plurality of flow control valves coupled to flow paths formed between the microfluidic reactor and the product chamber, the microfluidic reactor and the fluid chamber; and the microfluidic reactor and the waste chamber.

2. The microfluidic chip of claim 1, further comprising a mixing device coupled to at least one of the plurality of reagent sources, the macro-chamber, and the microfluidic reactor, wherein the mixing device is configured to mix two or more reagents among the plurality of reagents and generate a mixture of two or more reagents.

3. The microfluidic chip of claim 2, wherein the microfluidic reactor is coupled to the macro-chamber and the plurality of reagent sources via the mixing device.

4. The microfluidic chip of claim 2, wherein the mixing device is configured to receive the two or more reagents from the plurality of reagent sources, mix the two or more reagents, and feed the mixture of two or more reagents into at least one of the macro-chamber, the microfluidic reactor.

5. The microfluidic chip of claim 2, wherein the mixing device is configured to receive two or more reagents among the plurality of reagents from the macro-chamber, mix the two or more reagents, and feed the mixture of two or more reagents into the microfluidic reactor.

6. The microfluidic chip of claim 2, wherein the microfluidic reactor feeds the reaction content to the macro-chamber via the mixing device.

7. The microfluidic chip of claim 2, wherein the mixing device is integrated to the macro-chamber and configured to mix two or more reagents among the plurality of reagents in the macro-chamber.

8. The microfluidic chip of claim 2, wherein the mixing device is integrated to the microfluidic reactor and configured to mix two or more reagents among the plurality of reagents in the microfluidic reactor.

9. The microfluidic chip of claim 2, wherein the mixing device comprises a gas bubble source for supplying gas bubbles to the macro-chamber to enable mixing of the two or more reagents among the plurality of reagents in the macro-chamber.

10. The microfluidic chip of claim 1, further comprising the fluid chamber for storing a marker fluid, wherein the microfluidic reactor is coupled to the macro-chamber via the fluid chamber.

11. The microfluidic chip of claim 10, wherein the marker fluid comprises at least one of a gas, a fluorescent liquid; wherein the fluorescent liquid and gas have different properties.

12. The microfluidic chip of claim 10, further comprising a fluid source for feeding a displacement fluid to the macro-chamber so as to displace a mixture of two or more reagents or the reaction content from the macro-chamber such that the mixture of two or more reagents or the reaction content is transported to the microfluidic reactor as a slug disposed between the marker fluid and the displacement fluid.

13. The microfluidic chip of claim 12, further comprising at least one sensor disposed at an at least one location of the chip for sensing an interface between the displacement fluid and the mixture of two or more reagents or the reaction content at the at least one location of the chip.

14. The microfluidic chip of claim 13, further comprising a closed-loop control system for controlling flow of the reagents and the reaction content between the plurality of reagent sources, the macro-chamber, and the microfluidic reactor based on an output from the at least one sensor.

15. The microfluidic chip of claim 1, further comprising an open-loop control system for controlling flow of the reagents and the reaction content between the plurality of reagent sources, the macro-chamber, and the microfluidic reactor.

16. The microfluidic chip of claim 1, wherein the microfluidic reactor is configured to be maintained at a first temperature and the macro-chamber is configured to be maintained at a second temperature different from the first temperature.

17. The microfluidic chip of claim 1, wherein the microfluidic reactor and the macro-chamber are configured to be maintained at a predefined temperature.

18. The microfluidic chip of claim 1, wherein the microfluidic reactor comprises a plurality of reactor units, wherein the macro-chamber is coupled to the plurality of reactor units via a switching device configured to control flow of the plurality of reagents or the reaction content between the macro-chamber and the plurality of reactor units.

19. The microfluidic chip of claim 1, wherein the microfluidic reactor is integrated to the macro-chamber.

* * * * *